(12) United States Patent
Dieke et al.

(10) Patent No.: US 10,594,540 B2
(45) Date of Patent: Mar. 17, 2020

(54) WIRELESS DATA TRANSFER

(71) Applicant: PIONEER HI-BRED INTERNATIONAL, INC., Johnston, IA (US)

(72) Inventors: Stephen T. Dieke, West Des Moines, IA (US); Russel Howe, Glendale, CA (US); Harley P. Janssen, Johnston, IA (US); James W. Sarrett, Sunland, CA (US); Kent A. Vander Velden, Johnston, IA (US)

(73) Assignee: PIONEER HI-BRED INTERNATIONAL, INC., IA (US)

( * ) Notice: Subject to any disclaimer, the term of this patent is extended or adjusted under 35 U.S.C. 154(b) by 209 days.

(21) Appl. No.: 15/692,578

(22) Filed: Aug. 31, 2017

(65) Prior Publication Data
US 2018/0069746 A1 Mar. 8, 2018

Related U.S. Application Data

(60) Provisional application No. 62/383,062, filed on Sep. 2, 2016.

(51) Int. Cl.
| | |
|---|---|
| *G06F 15/16* | (2006.01) |
| *H04L 29/12* | (2006.01) |
| *G06F 13/16* | (2006.01) |
| *G06F 13/40* | (2006.01) |
| *G06F 13/42* | (2006.01) |
| *G06F 11/30* | (2006.01) |
| *G06F 9/4401* | (2018.01) |

(52) U.S. Cl.
CPC ............ *H04L 29/12* (2013.01); *G06F 9/4415* (2013.01); *G06F 11/30* (2013.01); *G06F 11/3034* (2013.01); *G06F 11/3041* (2013.01); *G06F 11/3055* (2013.01); *G06F 13/16* (2013.01); *G06F 13/4068* (2013.01); *G06F 13/4282* (2013.01); *G06F 9/4416* (2013.01); *G06F 2213/0042* (2013.01)

(58) Field of Classification Search
USPC ....................................................... 709/217
See application file for complete search history.

(56) References Cited

U.S. PATENT DOCUMENTS

| | | | | |
|---|---|---|---|---|
| 7,137,034 | B2 * | 11/2006 | Largman | ............. G06F 11/1417 714/23 |
| 7,242,109 | B2 | 7/2007 | Beeren | |
| 7,468,638 | B1 * | 12/2008 | Tsai | ......................... H04B 1/48 331/126 |

(Continued)

FOREIGN PATENT DOCUMENTS

| | | |
|---|---|---|
| CN | 201427527 Y | 3/2010 |
| CN | 203250191 U | 10/2013 |
| CN | 20337188 U | 12/2013 |

OTHER PUBLICATIONS

Anonymous, "The Farm Command Ecosystem: CanPlug", Crop Ventures, May 12, 2015 (May 12, 2015).

*Primary Examiner* — Alicia Baturay

(57) ABSTRACT

A device and methods for wirelessly transferring farming data to and from an agricultural monitor. Certain embodiments also relate to specific methods used to change the boot order of a computing device that may be used to enable wireless data transfer.

8 Claims, 6 Drawing Sheets

(56) References Cited

U.S. PATENT DOCUMENTS

| | | | |
|---|---|---|---|
| 7,849,360 B2 * | 12/2010 | Largman | G06F 11/1417 |
| | | | 714/13 |
| 8,145,378 B2 | 3/2012 | Schlingmann et al. | |
| 8,713,212 B1 | 4/2014 | Yoshinaga | |
| 8,869,138 B2 * | 10/2014 | Bandakka | G06F 11/1417 |
| | | | 717/174 |
| 9,344,529 B2 * | 5/2016 | Killpack | H04L 69/04 |
| 10,269,452 B2 * | 4/2019 | Volpe | A61N 1/3968 |
| 2012/0324067 A1 | 12/2012 | Hari et al. | |
| 2014/0122147 A1 | 5/2014 | Christie et al. | |
| 2015/0234767 A1 | 8/2015 | Tatge et al. | |
| 2016/0275580 A1 * | 9/2016 | Uechi | G06Q 30/0609 |

* cited by examiner

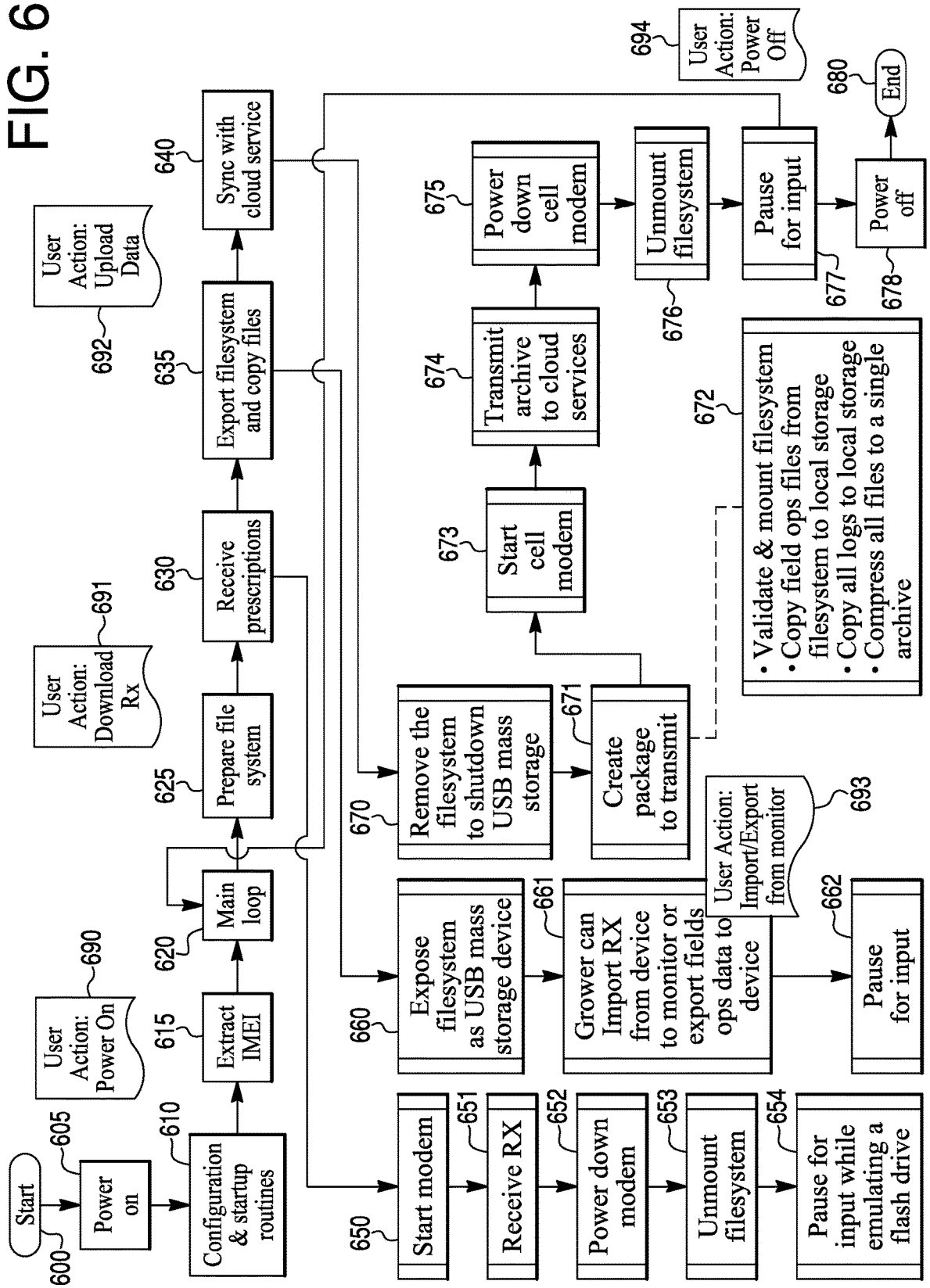

WIRELESS DATA TRANSFER

TECHNICAL FIELD

Embodiments of the present invention relate generally to automated systems and methods for wirelessly transferring farming data to and from an agricultural monitor. Certain embodiments of the present invention also relate to specific methods used to change the boot order of a computing device that may be used to enable wireless data transfer.

BACKGROUND

Farm equipment, such as planters, harvesters, sprayers and tractors, are equipped with monitors that both track the progress and actions of the farm equipment and can be programmed to direct the farm equipment to perform certain actions. The position of the farm equipment is nearly always tracked through use of the global positioning system.

Devices and methods are needed to communicate wirelessly with the agricultural equipment monitors, allowing information ("agricultural data") to be easily sent from the agricultural equipment to a server, and information, including prescriptions, to be easily sent from a server to the agricultural equipment. Embodiments of this invention relate to devices and methods that may be used for the wireless exchange of agricultural data and prescription with various makes and models of agricultural equipment monitors.

DEFINITIONS

"Agricultural monitor" means a hardware device in agricultural equipment such as a tractor or combine, typically located in the cab, that controls settings on the machine, including automatically in response to prescriptions, and collects and compiles data. Monitors are available from a wide variety of manufacturers, including from Precision Planting, Raven, John Deere, Case IH, and Case New Holland.

"Agricultural equipment" means equipment used in an agricultural operation, including, without limitation, tractors, trucks, automobiles, all-terrain vehicles (ATVs), or any other self-propelled vehicle or machine typically used to carry out farming operations. Such equipment may include implements such as, without limitation, cultivators, pickers, harrows, plows, rotators, rollers, mowers, seeders, feeders, planters, drills, spreaders, fertilizers, sprayers, sorters, harvesters, conveyors, carts, wagons, threshers, pickers, reapers, transporters, loaders, balers, milking machine, grinder, splitter or trailers.

"Agricultural operation" means a farming operation in any area of land or water (for aquaculture) that is devoted primarily to producing and managing food (i.e. produce, grains, or livestock), fibers, and/or fuel from farming. Farming may comprise, without limitation, a dairy farm, an orchard, a vineyard, a stable, a ranch, a garden, a fish farm, a feedlot, a farmstead or a plantation.

"APN" or "Access Point Name" is a name to identify the gateway between a cellular network and the cellular modem connected to the computing device.

"Database" means an organized collection of data. It may be a collection of schemas, tables, queries, reports, views and other objects. The data are typically organized to model aspects of reality in a way that supports processes requiring information, such as modelling a seed planting density prescription to optimize yield based on prior yields and seed planting density information from that same GPS location.

"Prescription" means a specification or series of specifications for how to perform an agricultural operation with agricultural equipment. The performance of the agricultural operation is typically based on the geo-referenced position of the area of land. The abbreviation Rx is used in FIG. 6 for the word prescription.

"USB flash drive" means a portable device that typically implements the USB Mass Storage Class and has onboard memory to store data.

"Server" means a computer or system that responds to requests across a computer network to provide, or help to provide, a network or data service. The server may exist as part of a data or networking center. A database may reside on the server.

"USB mass storage class" means a set of computing communication protocols that make a USB device accessible to a host computing device and enables file transfers between the host and the USB device. To a host, the USB device acts as external storage, and the protocol set interfaces with a number of storage devices.

"USB port" means a Universal Serial Bus port, which is a standardized connection for computers and peripheral devices. The term includes any format of USB, including standard, mini and micro, as well as any of the USB protocols, including but not limited to USB 1.x, USB 2.0, USB 3.0, USB 3.1 and USB Type-C.

BRIEF DESCRIPTION OF THE DRAWINGS

The invention will be understood by the following detailed description in conjunction with the accompanying drawings, wherein like reference numerals designate like structural elements, and in which:

FIG. 6 shows a high-level flow diagram of a second thread of a computer program application which illustrates the steps for transferring data to and from an agricultural monitor.

DETAILED DESCRIPTION

Figure 1:
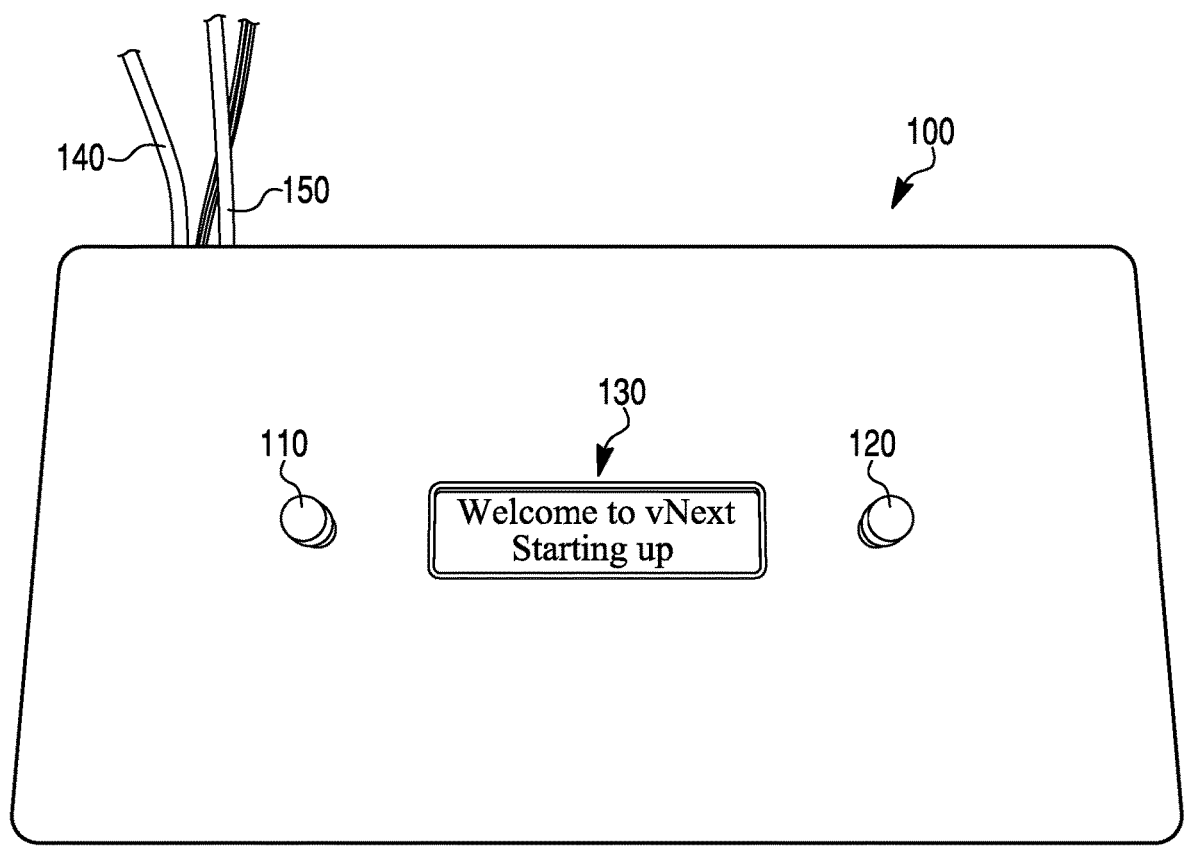
FIG. 1 shows a drawing illustrating, by way of example only, the wireless data transfer device which connects to the USB port of an agricultural monitor.

Contemporary agricultural equipment, such as tractors and planters, include computer systems and controllers capable of permitting farmers and farming business to exercise extremely precise control over almost every aspect of a farming operation, such as fertilizing, planting, spraying or harvesting crops in a field. In a technique known as precision farming, the computer systems and related technology available today permits farming businesses to program the farming equipment to carry out farming operations almost entirely under automated control of software programs that can automatically activate and deactivate the machines, and even particular sections, row units, nozzles or blades on the implement at precisely the right time and place in order to optimize inputs such as seed, pesticide and fertilizer, and thereby achieve greater yields. During the course of performing farming operations, the computer systems and technology onboard the farming vehicles and farming implements typically transmit, receive and respond to electronic messages containing an enormous amount of very detailed operational data that describes almost every aspect of the farming operation. For example, if the farming vehicle and the farming implement used during a farming operation are a tractor and a planter, then the tractor and the planter will use the onboard computer systems and computer network to exchange and respond to a large number of messages that include operating parameters for the planter, such as seeding rate, hydraulic downforce, planting speed, row spacing, etc. It would be extremely useful to capture, store, analyze and share these operating parameters. A farmer could use this information, for example, to determine and compare this planting data with the plant health and or yield. The farmer could use this information to adjust planter settings, and a seed company could study and use the information to improve seed product yields.

Agricultural equipment monitors have USB ports primarily for the exchange of data with small, physical solid state flash or jump drives. Since the software for the different makes and monitors vary, any device, other than a flash or jump drive, must have software that is flexible enough to communicate with the different makes and models of monitors. For example, each of the John Deere GS3 and the Case AFS Pro 700 represent large numbers of the farm equipment agricultural monitors in use. Accordingly, a wireless device operating through a USB port would need to effectively communicate with both the John Deere GS3 and Case AFS Pro 700 monitors in order to be more universally compatible.

When a device is plugged into the USB port of a John Deere GS3 monitor, the device is detected by the monitor, and the monitor automatically enters a data transfer mode screen. This data transfer screen will not allow the monitor to be used for farming operations, and so the USB connected device must be either disconnected, or otherwise cause the John Deere GS3 monitor to react as though the USB device has been disconnected, in order for the monitor to leave the data transfer screen.

When a device is plugged into the USB port of a Case AFS Pro 700 monitor, the device is not detected by the monitor unless the USB device is plugged in and active prior to the boot up sequence of the Case AFS Pro 700 monitor. While this works for a USB flash drive, a computing device connected to the AFS Pro 700 monitor via USB must present its storage as available before the monitor is powered on.

Therefore, for a wireless data transfer device to be always plugged in and used with both a John Deere GS3 monitor and Case AFS Pro 700 monitor, the device must be configured to account for the different needs of these two yield monitors, as well as to operate with agricultural monitors from other manufacturers.

Embodiments of the present teaching relate to a device and method that may be used to obtain agricultural data from and send prescriptions to agricultural monitors of various makes and models via a wireless network to allow on demand communication with the farm equipment.

Embodiments of the current invention provide a simple to use self-contained wireless data transfer device in an open brand-agnostic system that can both send and receive agricultural data and prescriptions to various makes and models of agricultural machines directly through the USB port of the agricultural monitor. The self-contained wireless data transfer device includes a computing device, a USB connector, a cellular modem, an application program, an indicator status display and a function switch. The USB connector connects the wireless data transfer device directly to a USB port on an agricultural equipment monitor.

In certain embodiments, the computing device is a low power consumption circuit board comprising a processor and expanded peripherals. Examples of such computing devices include the BeagleBone Black, available from the BeagleBoard.org Foundation, which can be programmed in any number of languages on top of industry standard operating systems, such as Android and many different Linux distributions. Other computing devices that may be used include Raspberry Pi available from the Raspberry Foundation. While the computing device may be similar to the processor found in cell phones or tablets, the cell phones and tablets suffer the disadvantage of having software restrictions imposed by the cell phone carrier or operating system that may need to be removed in order to permit root access to the operating system file system and manager, or that otherwise restrict the ability of the software to function. Therefore, while in some embodiments it may be technically possible to use only a cell phone or tablet, in certain other embodiments, cell phones or tablets are specifically not used in favor of a restriction-free computing device such as a BeagleBone Black or Raspberry Pi.

To obtain the wireless signal, the computing device is connected, or optionally may be integrated with, a cellular modem. The cellular modem provides the link to a wireless network, such as a cellular or PCS system that uses a low power transmitter or radio relay antenna device to relays calls or data from one area to the next. An APN is used to permit the cellular modem to connect to the network. Cellular modems that connect to computing devices are commercially available for a variety of cellular phone networks and standards, such as GSM, UMTS, LTE and even CDMA.

Optionally, or in addition, the wireless device may communicate via other wireless networks such as microwave radio used by satellites, high and low frequency radio, and/or spread spectrum technology to enable communication between multiple devices in a limited area such as WiFi or ZigBee. IEEE 802.11 defines a common flavor of open standards wireless radio wave technology known as WiFi. IEEE 802.15.4 defines a common flavor of open standards wireless radio wave technology known as ZigBee. The networks may be of any type, including a wireless mesh network, a wireless wide area network or a global area network.

The computing device is also connected to an indicator status display, which can be any type of display, including a light, LED, LCD or LED back-lit LCD. In embodiments that are not self-contained and a cell phone or tablet is used, the indicator status display may be a physical button or virtual button on the screen of the cell phone or tablet, and the screen of the cell phone or tablet may also be used to show the status of the device.

The computing device is programmed with a sequence of computer code. In one embodiment, the software has been programmed in Python and C++ running on in Linux. This has the advantage of not requiring physical modification of the computing device itself. It also provides support for USB mass-storage devices via the Linux kernel. Linux provides drivers for USB mass-storage device class devices, including quirks, bug fixes and additional functionality for devices and controllers.

The computing device memory may be any type of memory. In certain embodiments, volatile memory is used. Volatile memory is primary storage, which is typically dynamic-access memory (DRAM), and fast CPU cache memory, which is typically static random-access memory (SRAM). In some embodiments, non-volatile memory is used, which has the advantage of retaining its stored information even when not powered. Examples include read-only memory, flash memory, and storage discs or drives. In some embodiments flash memory is used. Flash memory may be NAND or NOR-type. NAND type flash memory may be written and read in blocks which are smaller than the entire device. NOR-type flash memory allows a single machine word (byte) to be written to an erased location or read independently. Flash memory organization includes both one bit per memory cell and multiple bits per cell (called MLC, Multiple level cell). The memory cells are grouped into words of fixed length, for example, 1, 2, 4, 8, 16, 32, 64 or 128 bit. Each word can be accessed by a binary address of N bit.

Because of its relative simplicity, the most-common file system on embedded devices such as USB flash drives, cameras, or digital audio players is Microsoft's FAT or FAT32 file system (with optional support for long filenames) or other FAT variants such as xFAT or vFAT. As used herein, all such file system are referred to as a "FAT file structure". Any of these may be used with the embodiments described herein, and, in fact, any underlying file systems could be used if supported by the operating system of the computing device, which in the described embodiment is Linux.

Two main partitioning schemes are used by vendors of pre-formatted devices. One puts the file system (usually FAT32) directly on the device without partitioning, making it start from sector 0 without additional boot sectors, headers or partitions. The other uses a DOS partition table (and optionally MBR code), with one partition spanning the entire device. This partition is often aligned to a high power of two of the sectors (such as 1 or 2 MB), common in solid state drives for performance and durability. Some devices with embedded storage resembling a USB mass-storage device (such as MP3 players with a USB port) will report a damaged (or missing) file system if they are reformatted with a different file system. However, most default-partition devices may be repartitioned (by reducing the first partition and file system) with additional partitions. Such devices will use the first partition for their own operations, and after connecting to the host system, all partitions are available.

To send prescriptions from the computing device to the agricultural monitor, the file type, name and structure on the file partition of the computing device must be a file type, name and structure that is recognized by the agricultural monitor. For many types of agricultural monitors an ISO image is used. Many tools exist to convert an ISO image to USB or other memory types, such as "Rufus" and "ISO to USB", thereby allowing the USB or other memory type to mimic the functionality of a physical CD or DVD disc. Certain folder names may be needed and can be different depending on the agricultural monitor manufacturer, such as for example, with a John Deere agricultural monitor an "Rx" folder is used. This is the folder that will house the agricultural prescription to be sent from the memory operably linked with the wireless data transfer device to the agricultural monitor.

The computing device further comprises a USB connection port that enables a connection to the agricultural monitor via a USB cable. The USB connection is directed, with both upstream and downstream ports emanating from the agricultural monitor as the single host, with the computing device programmed to be recognized as a device. In some embodiments, the computing device has a second USB connection port that can accept a powered charge and can be used to charge a battery connected to the computing device.

The computing device, in most cases as provided by the manufacturer, will be designed to boot from its internal memory, and the computer program can be placed in a partition of the internal memory. However, in some embodiments, it is desirable to modify the computing device to boot from removable storage, such as a microSD card. This allows more of the internal computing device memory to be available for sending and receiving data and also allows for computer program updates, including firmware updates, to be provided to users via an updated removable storage card. The microSD card may contain the operating system, which can be updated with a replacement microSD card or via the network connection (cellular or otherwise).

In the various embodiments, several methods may be used to change the boot order. One method that can be used, depending upon the computing device, is to simply hold the microSD boot button such as on a BeagleBone Black, however, this requires user interaction. A non-user interactive method of changing the boot order is to cause a physical change on power up. With a BeagleBone Black computing device, this can be accomplished by inserting a 100 Ohm resistor across the R93 pads, however, this interferes with the HDMI Interface and/or the LCD panels. In one embodiment, a 100 Ohm resistor between the SYS BOOT2 and GND can be gated by the SYS RESETn signal to ensure that after coming out of reset, the signals are removed from the SYS BOOT2, preserving HDMI interface and/or the LCD panels, but necessitating the addition of a daughter circuit board. In another embodiment, a novel solution consists of adding a high value resistor. A 10,000 Ohm resistor was tested and tried across the R93 pads of a BeagleBone Black, and this resistor changed the boot order on startup while maintaining the functionality of the HDMI Interface and the LCD panel, leaving open these expansion ports for use. Other high value resistors can also be used. Based on a 3.3v CMOS logic family and seeking a voltage of less than 0.8V, the range expected to work for this purpose would be greater than 100 ohms up to about 32,000 ohms, based on the solution to the inequality $3.3(x/(100K+X))<=0.8$, so it was somewhat unexpected that a 10,000 ohm resistor functioned for this purpose. In various embodiments, resistors with a value of greater than 100 Ohms but less than 100,000 Ohms may be used, including resistors in the range of greater than 100 and less than 50,000 Ohms, in the range of 1,000 to 90,000 Ohms, in the range of 3,000 to 70,000 Ohms, in the range of 5,000 to 50,000 Ohms, in the range of 5,000 to 40,000 Ohms, in the range of 5,000 to 30,000 Ohms, in the range of 5,000 to 20,000 Ohms, in the range of 32,000 to 100,000 ohms.

To operate the device, the user plugs in the device into the USB port of the agricultural monitor and presses the power button on the device. For operation with a John Deere monitor, the user would first power on the John Deere monitor. When the user is ready to transfer data to the device, the user would press the function button on the device. This activates custom software that causes the device to first download any prescriptions for the agricultural monitor from the server and then present itself as a USB mass storage device to the agricultural monitor by using a USB descriptor that identifies the computing device as USB mass storage, such as binterfaceClass=8 (Mass Storage), binterfaceSubClass=6 (SCSI), or binterfaceProtocol=80 (Bulk-Only). The John Deere monitor automatically detects the USB ID and changes to the transfer data screen. The user would then use the John Deere monitor to import prescriptions from the device or transfer data from the John Deere monitor to the device. When the user is done transferring data, the user presses the device's function button again. This second activation of the function button activates custom software that causes the device to inspect the data transferred from the monitor and place this data in its partitioned memory, add additional system logs, bundle files into a single file, compress the single file for efficiency, send the single file to a remote server, and stop presenting itself as a USB mass storage device. Because the device stops presenting itself as a USB mass storage device, the John Deere monitor does not detect the device as being plugged into the USB port, even though the device can in fact remain plugged in, and takes the user out of the data transfer screen of the agricultural monitor. This allows the agricultural monitor to be used even while the device remains plugged into the agricultural monitor. This makes the device easier to use and manage.

For operation with a Case AFS Pro 700 monitor, the user will connect the device to the agricultural monitor with a USB cable, press the device's power button and then press the function button. Pressing the function button will first download a prescription from the cloud for the device and then present itself as a USB mass storage device to the monitor. Once the device's USB interface is in a state that is presenting itself as a USB mass storage device, the user can then power on the Case monitor. As the user is performing normal field operations such as planting or harvesting, the Case monitor is reading and writing data directly to the device. When the user is done with field operations, the user will shut off the Case monitor, and then press the function button the on the device. This will activate custom software that uploads the data written to the device by the monitor as well as stop presenting itself as a USB mass storage device.

The steps for other agricultural monitors not needing a special power or connection sequence are similar, but the computing device can be powered on and the function key pressed at any time during operation of the monitor before data is to be imported from or exported to the computing device.

ILLUSTRATIVE EMBODIMENT

An external illustrative embodiment of a self-contained wireless data transfer device (100) is shown in FIG. 1. The device comprises a device container (100) comprising the elements of the device described herein. Visible from the outside of the device are a power switch (110), a function switch (120) and an LCD display (130). Cables exiting the container comprise a USB cable (140) for producing a data connection with the agricultural monitor, and a USB cable (150), for connecting to a powered USB port and recharging the internal battery of the device. Three additional wires may optionally be exposed to provide a low voltage serial connection to an operating system console, for programming and for diagnostics. In this embodiment, an 8-bit 2×16 character LCD display (130) is used, which is capable of displaying a text message to the user advising the user of status of the wireless data transfer device. Alternative methods of communicating the status could also be used, which include using alternative types of LCD displays, LED lights and/or voice prompts.

Figure 2:
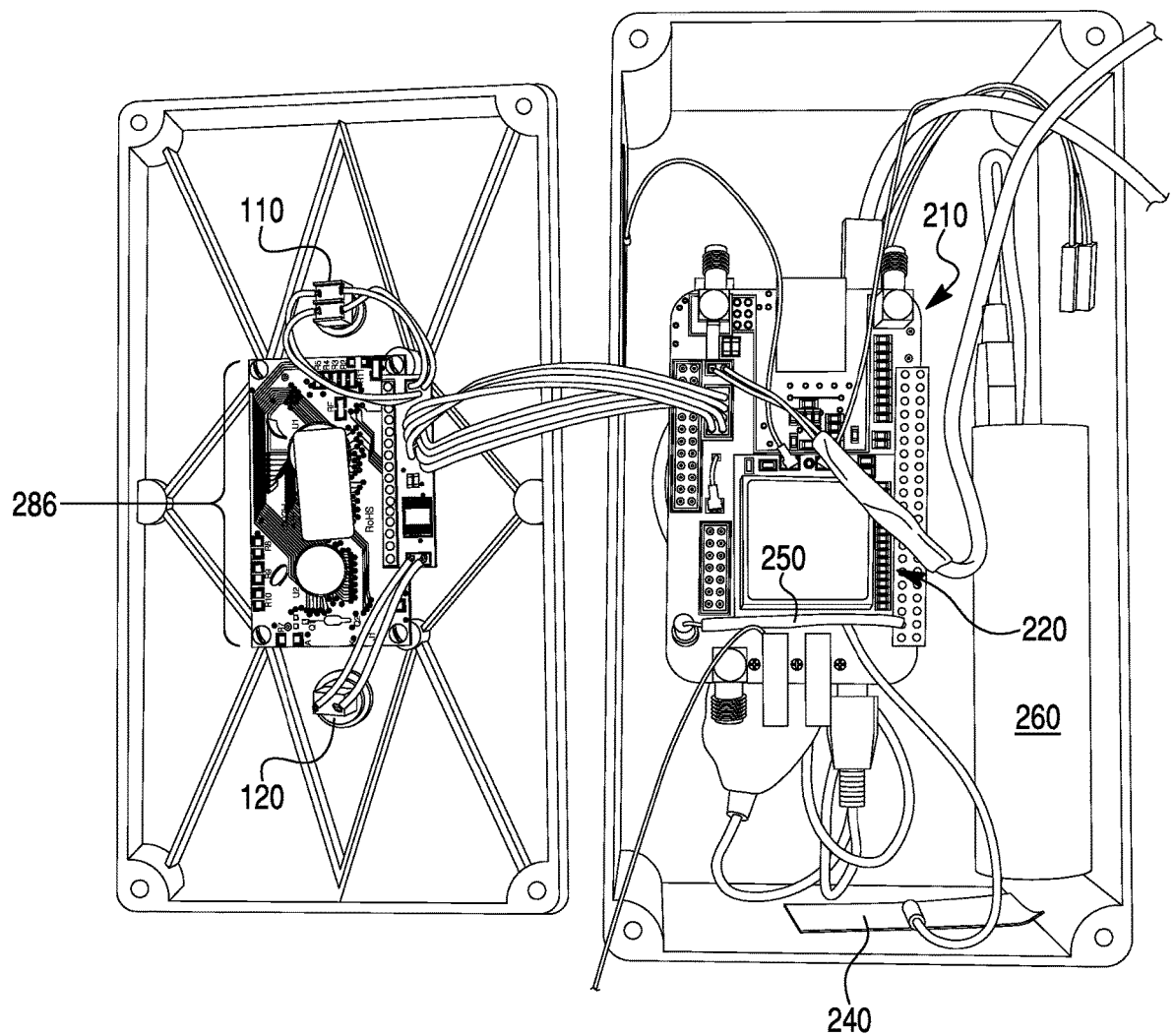
FIG. 2 shows a drawing illustrating, by way of example only, the internal components of the wireless data transfer device.

An internal illustrative embodiment of a self-contained wireless data transfer device (100) is shown in FIG. 2. The device (100) comprises a computing device (210) connected to a cellular modem daughter board (220) via a wired connection. An antenna (240) is connected to the cellular modem (220) and, in this embodiment, attached to the internal edges of the device container (100). A battery (260) is also connected with the computing device (210). In this illustrative embodiment, the computing device (210) is a BeagleBone Black computing device and the cellular modem (220) is a NimbeLink cellular modem connected to the computing device (210) via a daughter board and USB cable. While USB cable connection to the NimbeLink daughter board is not required for basic operation because of the serial connection between the computing device and the mother board, the USB cable provides a higher bandwith connection, allowing high bandwith cellular transmission if the local cellular network allows. The back of power switch (110), function switch (120) and display (130) are visible. Also visible in FIG. 2 is the high value resistor (250).

Figure 3:
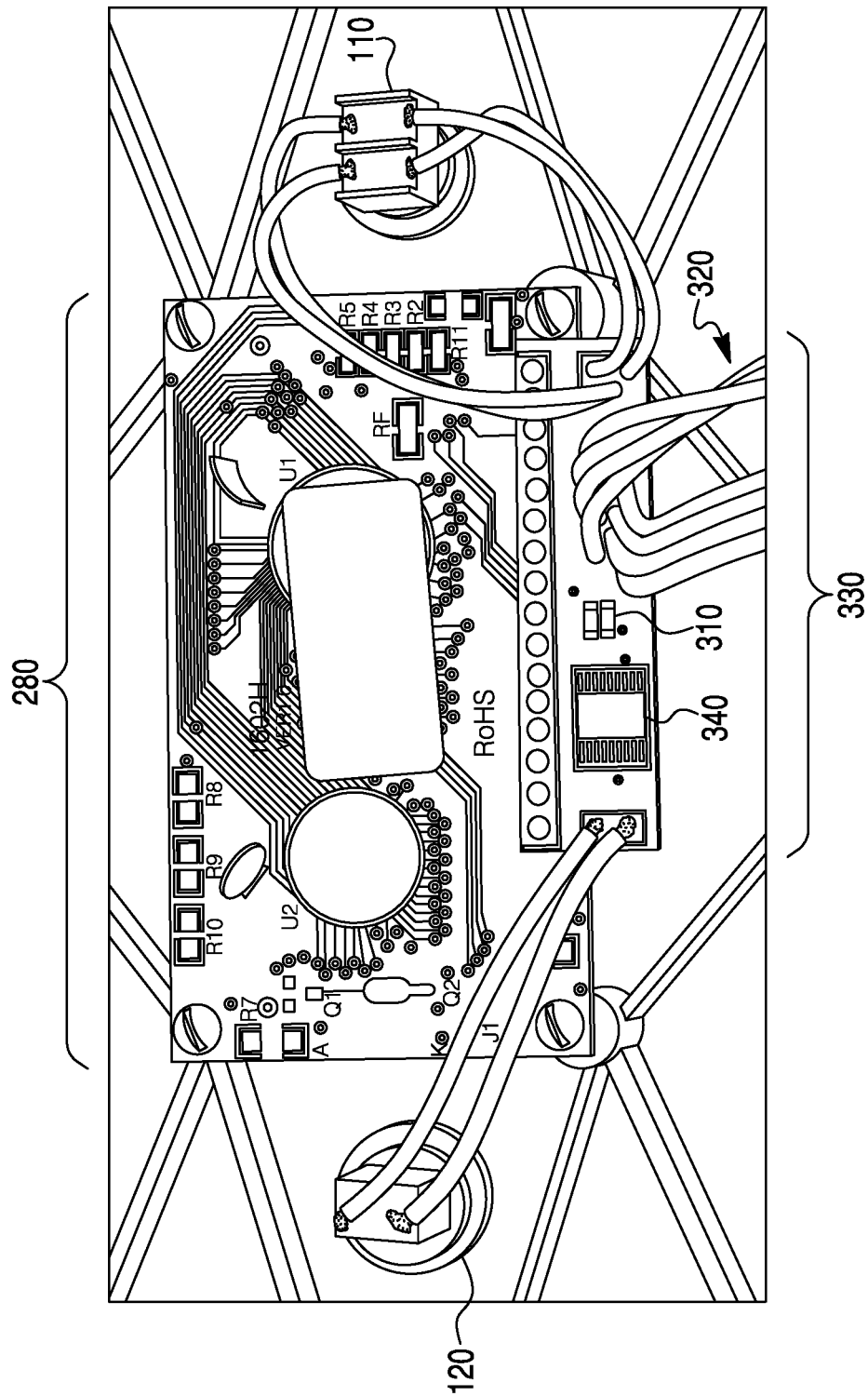
FIG. 3 shows a drawing illustrating, by way of example only, an alternative embodiment that uses a custom created printed circuit board that makes a connection to the LCD circuit board.
Figure 4:
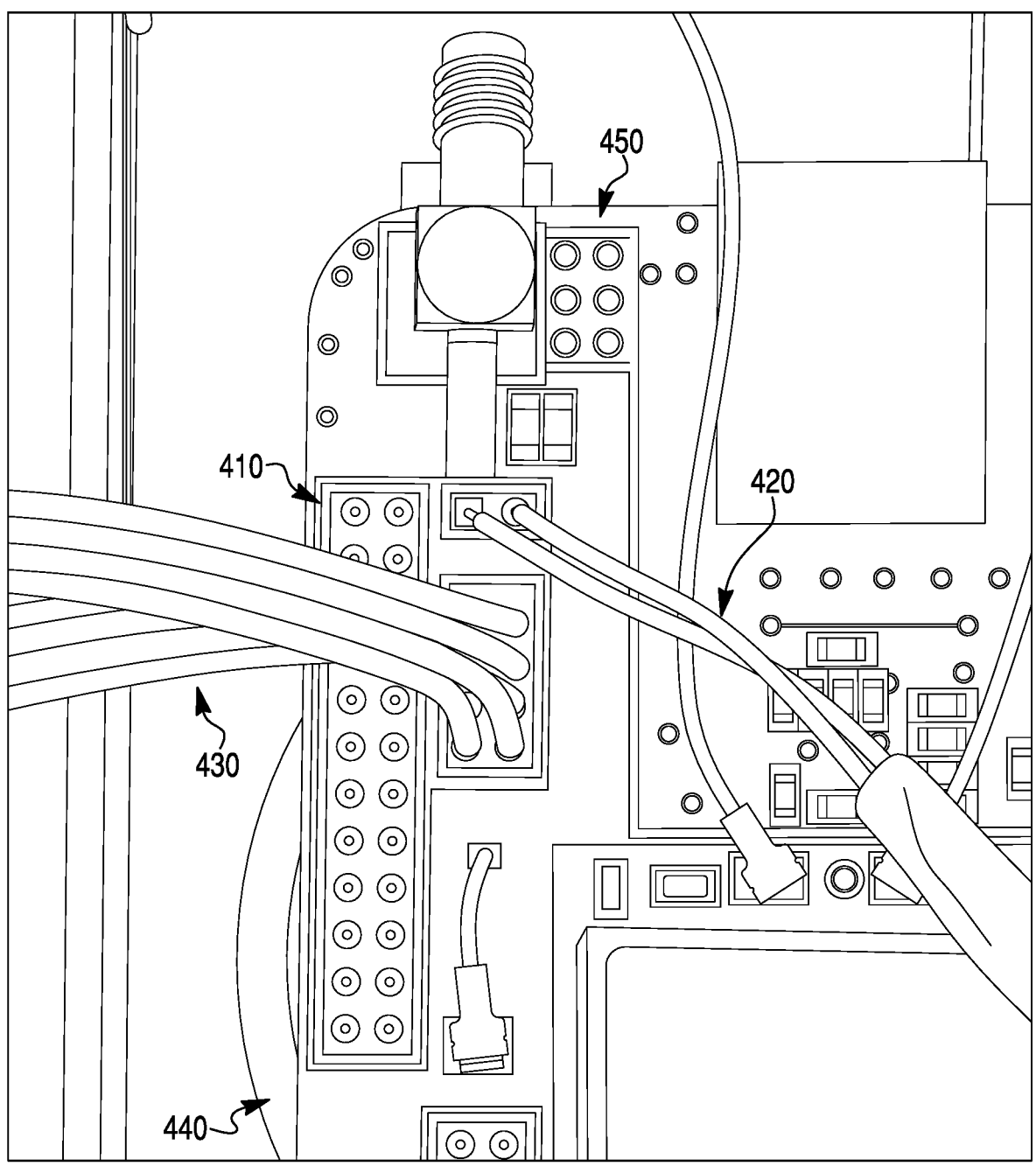
FIG. 4 shows a drawing illustrating, by way of example only, an alternative embodiment that uses a custom created printed circuit boards that makes a connection to the cellular modem circuit board.

As shown in FIG. 3 and FIG. 4, in an alternative embodiment of the invention two custom designed circuit boards (330) and (410) were created for integration of the computing device (210) and cellular modem (220) with the LCD display (130) circuit board, power switch (110) and function switch (120). The function switch (120) and power switch (110) connect to a printed circuit board (330) that also attaches to the circuit board for the LCD panel (286). On the printed circuit board is a general-purpose input-output extender that takes serial communication and converts it to parallel communication to interface with the LCD panel's data bus and control lines. In this embodiment, the serial communication that is used is the I2C (340) protocol and two 10 k ohm resistors are used for termination (310). Beyond providing reliable electrical connections, the printed circuit board provides reliable mechanical support of the components. In this embodiment, the power button has two poles where one connects the POW pin of the computing device, which, when momentarily connected to pin GND triggers the computing device to turn on. Holding the power button for a few seconds will force a power off of the computing device. Because the battery has its own power saving features, and will turn off all power after some time, preventing the computing device from being able to turn on, the second pole must be used to simultaneously send the necessary signal to the battery so the battery will turn on. The battery-on signal is established by placing a controlled load between the battery's positive and negative terminals through a resistor.

A bundle of wires (320 and 430) connect the printed circuit board of FIG. 3 (330) to a printed cellular modem daughter-board shown in FIG. 4, (410), which provides the electrical connections between the wires and the necessary pins on the computing device. It also makes the positive and negative connections (420) to the battery. Access to the pins of the computing device is done via the header of the cellular modem daughterboard (220). None of the required connections need to be made to the daughter-board, only to the computing device, but the daughter-board provides a convenient and stable connection point as all the pins of the computing device are passed through via the headers of the cellular modem daughter-board. All of the required pins are accessible in a small area, and so the computing device interface board is made no larger than what is needed to make all the required connections.

Figure 5:
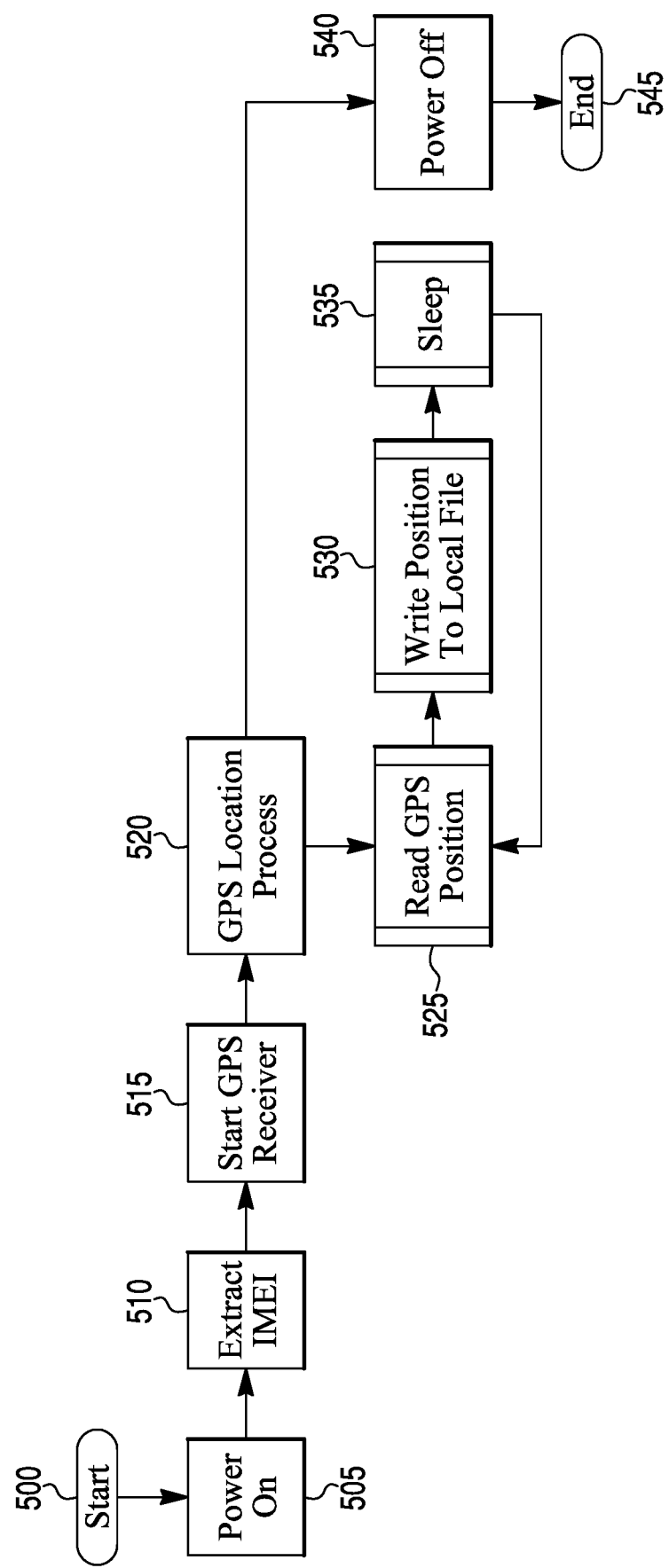
FIG. 5 shows a high-level flow diagram of a first thread of a computer program application which illustrates a method of recording GPS location during operation of the wireless data transfer device.

The software application programmed on the computing device is structured as shown in FIG. 5 and FIG. 6. FIG. 5 and FIG. 6 each represent a thread of a process flow, each of which run concurrently and separately.

FIG. 5 is initiated when the device is powered on (505), which occurs when the user powers on the device as described below in step 690 of FIG. 6. While the device remains on, this thread runs in a loop to periodically log the current GPS position of the device. The thread will end when the device is powered off (540), which will occur when the user makes the decision to stop transferring data and powers off the device as described below in step 694 of FIG. 6.

The Power On User Action (690) includes powering on both the agricultural monitor and the wireless data transfer device by plugging the USB cable (140) into the monitor and then pressing the power button on the device (110). This also executes steps 605-625.

The Download Rx User Action (691) is initiated by the user to download prescriptions from the internet and also initiate the USB connection between the monitor and the wireless data transfer device (steps 630, 650-654, 635, 660-661). This is done by pressing the function switch (120) when the following conditions are met or actions have been done: The agricultural monitor has been powered on; the wireless data transfer device USB cable (140) has been inserted into the monitor and the device powered on in the Power On User Action step (690); and the user is ready to receive prescriptions. Upon completion of sub-steps (650-654), the system resumes at originating step (630) in the main loop. Similarly, upon completion of sub-steps (660-662) the system resumes at originating step (635) in the main loop.

The Import/Export from Monitor User Action (693) is initiated by the user using the agricultural monitor. This is when the user will import prescriptions downloaded in step (691) from the wireless data transfer device to the monitor. This is also when the user will export field operation data such as planting or harvest data from the monitor to the wireless data transfer device for uploading to a server in a later step (692). The steps for importing data to the monitor and exporting data to the wireless data transfer device vary by monitor and the user manually performs these actions when necessary. This step can be done when the following conditions are met or actions have been done: The agricultural monitor has been powered on; the wireless data transfer device USB cable (140) has been inserted into the monitor and the device powered on in the Power On User Action step (690); the user has already completed the Download Rx User Action (691) to download prescriptions from the internet and initiate the USB connection between the monitor and wireless data transfer device (650-661); and the user is ready to import prescriptions from the wireless data transfer device and/or they are ready to export field operations data to the device for upload to a server step (692).

The Upload User Action (692) is initiated by the user to upload field operations data previously transferred to the wireless data transfer device in step (693) to a server. This step also causes the software to disconnect the wireless data transfer device from the agricultural monitor (steps 640,670-677). This is done by pressing the function switch (120), but only when the following conditions are met or actions have been done: The agricultural monitor has been powered on; the wireless data transfer device USB cable (140) has been inserted into the monitor and the device powered on in the Power On User Action step (690); the user has already completed the Download Rx User Action (691) to download prescriptions from the internet and initiate the USB connection between the monitor and wireless data transfer device (650-661); and the user has completed the Import/Export from monitor step (693).

The process in FIG. 6 can be repeated. The main loop is represented by steps 620, 625, 630, 635, 640, 670, 671 and 673-677. At step 677, where the system pauses for input, the user may choose to return to the main loop (620) by pressing the function switch (120) to re-initiate user action 691. Alternatively, if the user is finished with the transfer of all data, the user may press the power switch (110) to power off the device.

The prescription generation system may generate prescriptions of any type that may be used to operate parameter selections associated with agricultural equipment. By illustrative example, such prescriptions may relate to nitrogen application rates, seed planting depth and/or density, planting pattern, and/or agricultural chemical application. The wireless data transfer device serves to deliver such prescriptions to the agricultural monitor directly through a USB port connection.

The embodiments, methods, procedures and techniques described herein are representative of the preferred embodiments, are intended to be exemplary and are not intended as limitations on the scope. Changes therein and other uses will occur to those skilled in the art which are encompassed within the scope of this disclosure and are defined by the scope of the appended claims.

The invention claimed is:

1. A self-contained device for exchanging data with an agricultural monitor, comprising a computing device comprising a first USB port connected to a second USB port of an agricultural monitor, a physical modification of the computing device to change the boot order of the computing device so that it boots from removable storage on start up, a memory connected to the computing device, and a modem connected to the computing device, wherein the device further comprises a computer application program that: upon the first activation of a function switch by a user, causes the modem to call for a prescription to be downloaded and stored on the memory connected to the computing device, upon activation of a prompt on the agricultural monitor by a user, causes the prescription to be transferred to the agricultural monitor, upon a subsequent activation of a prompt on the agricultural monitor by a user, downloads agricultural data on the agricultural monitor to the memory connected to the computing device, and upon a subsequent activation of the function switch on the device wirelessly transfers the agricultural data to a server.

2. The device of claim 1, wherein the device comprises a high value resistor that enables start up from the removable storage.

3. The device of claim 2, wherein the high value resistor is in the range of 5,000 to 20,000 Ohms.

4. The device of claim 1, wherein the device can remain plugged into the agricultural monitor at all times during operation of the agricultural equipment.

5. The device of claim 1, wherein the device causes the first USB port to present a descriptor that identifies the computing device as USB mass storage.

6. The device of claim 1, wherein the modem receives an agricultural prescription that is stored in the memory connected to the computing device and transferred to the agricultural monitor.

7. The device of claim 1, wherein the function switch is a physical switch on the device.

8. A method for exchanging data with an agricultural monitor, comprising storing an agricultural prescription on a server and causing such prescription to be sent to the device of claim 1.

* * * * *